United States Patent [19]

Kirk, Jr. et al.

[11] 3,733,431

[45] May 15, 1973

[54] ELECTRONIC COMMUNICATION APPARATUS EMPLOYING ENCRIPTED SIGNAL DISTRIBUTION

[75] Inventors: Donald Kirk, Jr., St. Petersburg; Austin S. Coryell, Winter Haven, both of Fla.

[73] Assignee: Television Communications Corporation, New York, N.Y.

[22] Filed: Mar. 10, 1971

[21] Appl. No.: 122,660

[52] U.S. Cl. ......................178/5.1, 325/33, 330/141

[51] Int. Cl. ..............................................H04n 1/44

[58] Field of Search ......................178/5.1; 179/1.5 R, 179/1.5 E, 1.5 S, 1.5 FE; 325/33; 330/141

[56] References Cited

UNITED STATES PATENTS

| | | | |
|---|---|---|---|
| 3,054,857 | 9/1962 | Weiss | 178/5.1 |
| 3,106,604 | 10/1963 | Shanahan | 178/5.1 |
| 3,466,385 | 9/1969 | Hendrickson | 178/5.1 |
| 3,025,350 | 3/1962 | Lindner | 179/1.5 E |

*Primary Examiner*—Benjamin A. Borchelt
*Assistant Examiner*—S. C. Buczinski
*Attorney*—Hopgood & Calimafde

[57] ABSTRACT

Private programming information, e.g., television programs provided for a community antenna television signal distribution system (CATV) to supplement those programs received from local commercial television stations, are encripted by switching the private program signals between predetermined transmission channels at a low, preferably nonperiodic rate. A modulated pilot carrier is provided to communicate synchronizing information.

A special signal recovery apparatus at the station of a private service subscriber recovers the special programming by effecting a switching procedure inverse to that performed upon signal generation under control of the demodulated pilot signal. The video and sound programs presented by a conventional television receiver tuned to a private service channel comprises offensive interrupted bursts of two intermittently alternating programs which, moreover, may vary in intensity.

2 Claims, 3 Drawing Figures

Figure 1:
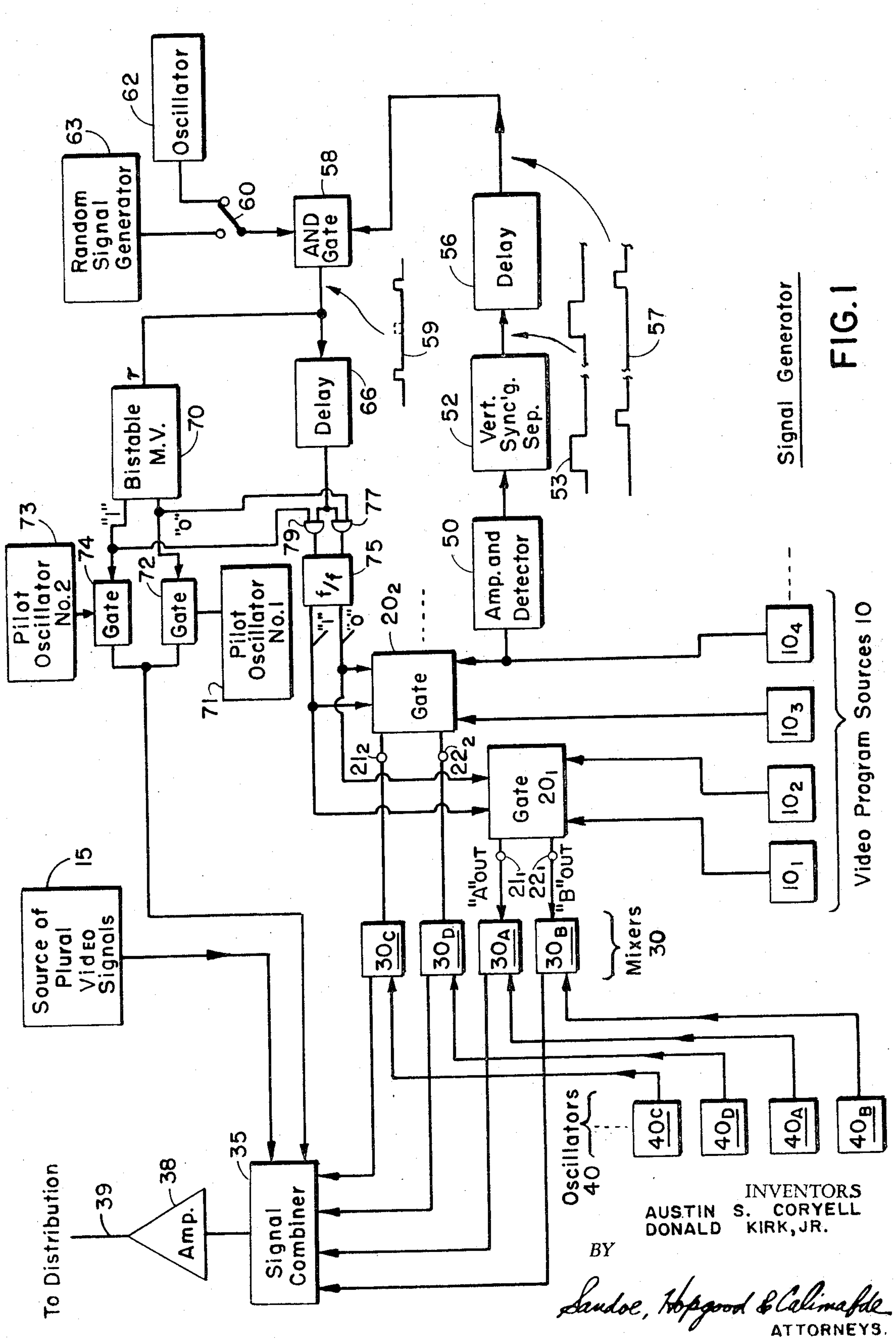

INVENTORS
AUSTIN S. CORYELL
DONALD KIRK, JR.

BY

Sandoe, Hopgood & Calimafde
ATTORNEYS.

INVENTORS
AUSTIN S. CORYELL
DONALD KIRK, JR.
BY
Sandoe, Hopgood & Calimafde
ATTORNEYS

ELECTRONIC COMMUNICATION APPARATUS EMPLOYING ENCRIPTED SIGNAL DISTRIBUTION

This invention relates to electronic communications and, more specifically, to an encription system for effecting secure program distribution to system subscribers.

In selected present day private communications systems, it has been found desirable to provide some electronic intelligence which may be received only by designated system subscribers who pay for this service. For example, the proprietor of a community antenna television system (CATV) inherently has excess signal propagating capacity beyond that required for programs recovered from local television stations, as by reason of unused channels (frequency bands) in any location and the frequency spacing between the alloted frequency bands for channels 6 and 7. The signal distributing cable and amplifier system may also include unused spectrum capacity at either or both ends of of the commercial television band.

The CATV system operator may thus impress additional, private programming information on his distribution cable for viewing by system subscribers who pay an additional consideration to support the additional service.

However, in the provision of the additional programming it is required as a practical matter that non-participating system subscribers cannot receive the private programming information either as a matter of course, or via an easily implemented television set modification.

It is therefore an object of the present invention to provide improved private communication encription apparatus.

More specifically, an object of the present invention is the provision of complementary signal encription and signal recovery apparatus wherein a plurality of intelligence signals may be reliably generated, propagated over a corresponding plurality of signal channels, and received only at participating subscriber stations.

It is a specific object of the invention to provide secure, encripted, private television program distribution apparatus.

The above and other objects of the present invention are realized in a specific, illustrative CATV system wherein a plurality of private program signals are switched, e.g., at periodic intervals, between a like plurality of available communications channels. Thus, for example, two video signal sources, each of intermediate frequency range, are switched between mixer structures each supplied with a sinusoid of a different frequency. A pilot signal is modulated with the program switching information, the switching being effected at a low rate of speed. The private programming, the modulated pilot, and conventional commercial programming signals are linearly combined, and distributed to cable subscribers serviced by the cable network.

A signal recovery converter at a participating subscribers station includes switching structure, synchronized by the pilot modulation information, for inverting the encription process effected upon private generation, and for thereby receiving the private television programs.

Nonparticipating cable subscribers will receive all commercial channels in conventional fashion. However, television receivers at these stations, when tuned to a private programming channel, will present offensive visual and sound presentations comprising bursts of program content switching between two (or more) information programs.

Figures 2, 3:
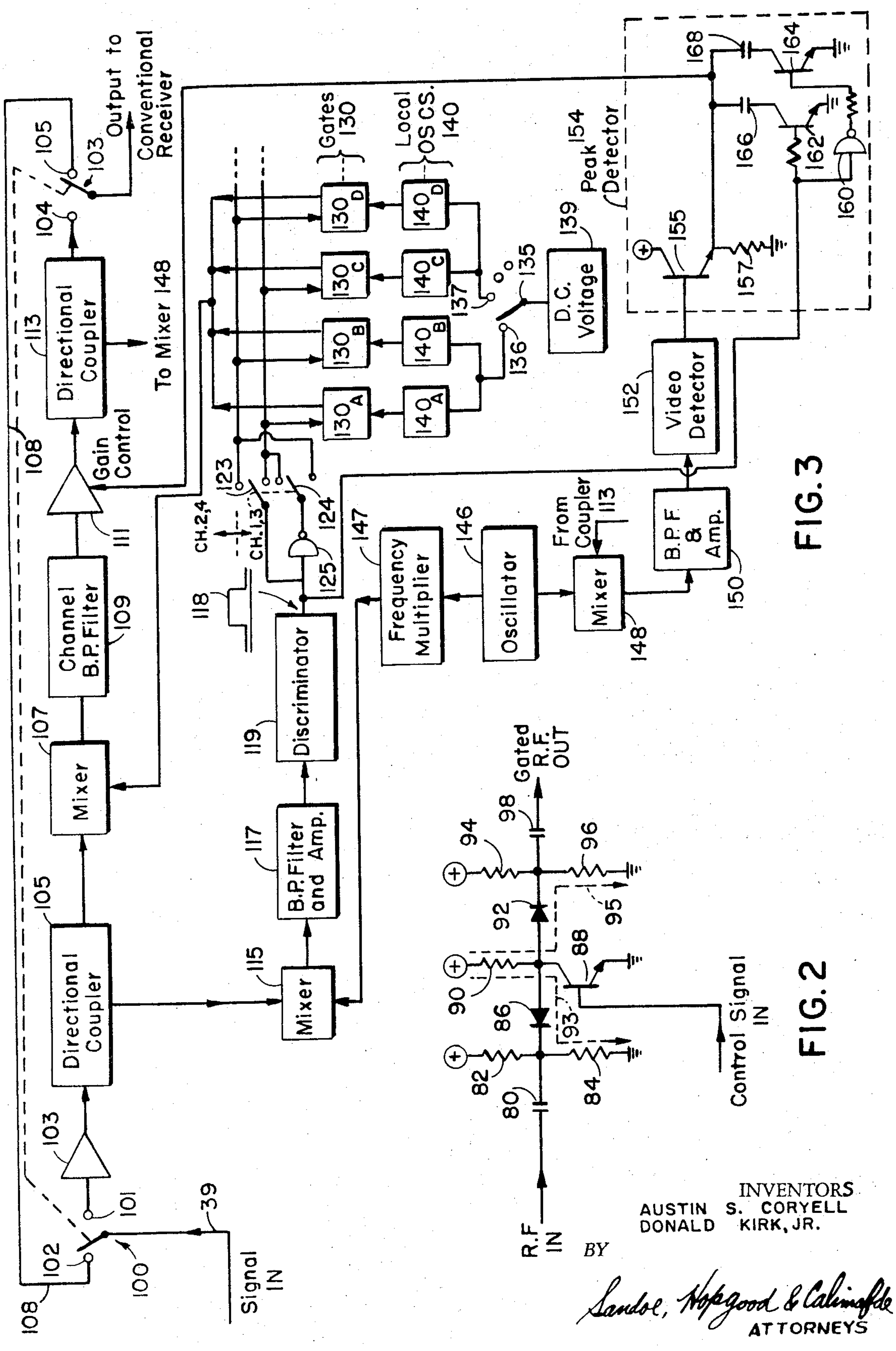

The above and other features and advantages of the present invention are realized in a specific, illustrative embodiment thereof, described in detail hereinbelow in conjunction with the accompanying drawing, in which:

FIG. 1 is a block diagram showing a signal generating and encripting arrangement illustrating the principles of the present invention;

FIG. 2 schematically illustrates gate structure employed in the arrangements of 1 and 3; and FIG. 3 is a block diagram depicting signal recovery converter apparatus operable in conjunction with video radio frequency signals produced by the generator of FIG. 1.

Referring now to FIG. 1, there is shown signal generating, encripting, and signal distributing apparatus, for example, employed for the distribution of television programming in a community antenna television system. The system supplies plural television programs, separated in frequency while coincidentally present on a distribution cable-amplifier network 39, for distribution to individual cable subscribers.

The programs impressed on the cable are of two basic types. First, a source of plural video signals 15 recovers all television signals broadcast by local commercial television stations. These signals are typically recovered by a sophisticated, well situated antenna complex, amplified, and impressed on the distribution cable network 39 without change of form. These signals may be viewed by a conventional television receiver at all subscriber stations connected to the cable.

As discussed above, the television signal distribution system 39 for CATV installations includes frequency propagating capacity beyond that consumed by available local commercial stations. Such spare bandwidth capacity exists, for example, beyond the extremes of the commercial frequency band; in vacant frequency channels not occupied by nearby commercial television stations; and in the frequency spacing between commercial channels 6 and 7 (assuming the cable does not also distribute commercial frequency modulation broadcasting). Thus, the proprietor of a private system such as CATV network may generate a plurality of supplementary video programs for distribution on its private network relying upon already existing, otherwise unused, signal propagation capacity. This private, noncommercial programming may comprise special or sporting events; current run theater or motion pictures; educational programming; special services such as security listings; or any other desired program content. As used herein, a "video" program includes all components of conventional television modulation, i.e., video, sound, color and control signal information.

As an economic matter, the special programming generated by the proprietor of the cable distribution system will typically require extra revenues from cable subscribers for its support. Accordingly, some mechanism is required to prevent those subscribers connected to the cable network who do not wish to pay an extra premium for the special programming from receiving such programming content, while permitting subscribers desiring these signals to obtain them. To this end, and in accordance with one aspect of the present invention, the video programs generated by the CATV proprietor are encoded at the signal generator of FIG. 1 before being combined on the distribution network 39 with the available commercial programming from the source 15 thereof. Further, a pilot signal, incorporating the intelligence necessary to reverse the encripting process, is supplied to the network 39.

At each subscriber station desiring the added programming in consideration for extra service payment obligations, the signal converter of FIG. 3 is provided and included between the distribution network 39 and a conventional television receiver. The converter of FIG. 3 operates under control of the pilot signal for automatically reversing the signal encription process when a private program vis-a-vis a commercial station is selected for viewing. At any non-participating cable system subscriber station, a television set tuned to a private service channel, but not employing the special converter of FIG. 3, will present offensive visual and audible outputs not suitable for reception. Thus, each class of subscriber will receive only that program content to which he is entitled.

With the above general overview in mind and returning again to the signal generator and encription apparatus of FIG. 1, there are shown four sources of special video programs $10_1$ through $10_4$. While four such video sources are shown in FIG. 1, it is to be understood that any number of such sources may be employed within the signal distribution bandwidth capacity of the network 39. It will be assumed that each of the sources 10 supplies a composite video program modulating a carrier of the same frequency in accordance with conventional television practices. Thus, for example, and for convenience, each of the sources 10 may supply a video program modulating a carrier at the conventional television intermediate frequency of 45,75 megacycles. The sources 10 may supply base band video signals, but this is not preferred.

As an underlying encripting procedure, the video program supplied by the sources 10 are arranged in pairs, e.g., $10_1$ and $10_2$, $10_3$ and $10_4$, . . . , each pair of signals being supplied to a gate $20_1$, $20_2$, . . . . Under control of timing signals discussed below, each gate alternately switches the two video programs supplied as input thereto to two gate output terminals 21 and 22 thereon at a relatively low repetition rate, e.g., ranging from ten times per second to several seconds per switching cycle. The switching is preferably done on a non-periodic basis, advantageously at random. Thus, for example, in one condition for the gate $20_1$, the video program supplied by the source $10_1$ appears at the output $21_1$ of the gate $20_1$ and is supplied to an A signal communications channel for cable distribution, while the output of the program source $10_2$ is supplied to a B CATV communication channel by the gate $20_1$ and the gate output $22_1$. All of the gates 20 are operated in synchronism, such that a program is supplied at such a time from the program source $10_3$ to a C communication channel (gate terminal $21_2$) while that from the source $10_4$ is supplied to a D channel. When the gates 20 reverse their switching condition, the program supplied by the sources $10_1$, $10_2$, $10_3$ and $10_4$ are respectively coupled to the distribution channels B, A, D, and C.

The modulated intermediate frequency signal at the gate output $21_1$ comprising alternate segments of the programs supplied by the video sources $10_1$ and $10_2$, is supplied as an input to a A-channel mixer $30_A$ which also receives the oscillation output of an associated local oscillator $40_A$. The mixer 30 includes a filter structure to select the desired difference frequency heterodyne product so that a modulated carrier of the A-channel spectrum range is produced.

The output of the mixer $30_A$ thus alternately comprises, as modulation intelligence, the video programs supplied by the program sources $10_1$ and $10_2$ raised in frequency by the local oscillator and mixer $40_A$ and $30_A$ to the fixed frequency band associated with the A channel. For example, in an area where a commercial station broadcasts on channels 7 and 9 while channel 8 is vacant, the apparatus $40_A$–$30_A$ may raise the input signals supplied thereto to the channel 8 spectrum.

A cable system subscriber opting not to receive the private source of programs will receive commercial television channels, supplied by the signal source 15 to the cable, in a routine manner. However, when the receiver is tuned to a private service channel, e.g., channel 8, the receiver alternately displays the video programs generated by the program sources $10_1$ and $10_2$ in alternate, short, random bursts. Thus, the program display is essentially unreceivable at such a conventional receiver, it being impossible as a matter of palatable human perception to follow either of the program sequences.

In a similar manner, the gate $20_2$ alternately supplies the video programs supplied by the signal sources $10_3$ and $10_4$ to the C and D transmission channels where they are raised by mixer and local oscillator combinations $30_C$–$40_C$ and $30_D$–$40_D$ to appropriate, theretofore, vacant frequency bands. The output of each mixer $30_C$ $30_D$ will thus comprise alternate intervals of program information supplied by the sources $10_3$ and $10_4$, i.e., the signals developed by the sources $10_3$ and $10_4$ are always on different one of the channels C and D. In a similar manner, any other video sources 10 are encoded by structure similar to the elements 20–30–40.

The output of the commercial programming source 15, and the outputs from the mixer structures 30 are linearly combined in a signal combiner 34 of any conventional construction, e.g., of basic hybrid coil form, and impressed onto the cable system 39 via an amplifier 38. An encripted signal decoding pilot switching signal is also impressed on the cable via the signal combiner 35 for signal recovery purposes, as discussed below.

The manner of producing the channel modulation switching signal will now be considered. The video intermediate frequency wave from one of the private program sources 10 (each assumed to be in vertical synchronization) is taken from one of the sources, e.g., the video program source $10_4$, and is supplied to an amplifier and detector 50 for recovery of the video modulation. A vertical synchronization pulse separator circuit 52, of any conventional construction, then detects the incidence of vertical synchronizing pulse appearing about the beginning of each video field, as is well known for television communications. The output of the separator 52 thus comprises a waveform 53 shown in FIG. 1 comprising a pulse train corresponding to the vertical synchronizing pulses appearing at the beginning portion of each field. The pulse train 53 is then passed through a delay circuit 56, e.g., a monostable multivibrator for producing a delayed replica thereof such that the delayed pulses begin after the start of the actual synchronizing pulses. As will be more clear from the following description, use of the delayed waveform 57 to develop the encription switching signals avoids positional picture jitter which might otherwise obtain should video switching signals be developing at the leading edge of the vertical synchronizing pulse period.

The waveform 57 developed by the delay circuit 56, comprising one pulse for each video field is supplied as one input to an AND logic gate 58. The other input to the AND gate 58, selected by a selector switch 60, comprises the low frequency bipolar periodic output of an oscillator 62 or, preferably, a bipolar output of a random signal generator 63. The output of the AND gate 58, illustrated by a waveform 59, thus comprises an output pulse train occuring in coincidence with the delayed vertical synchronizing pulses given by the waveform 57, but having some pulses of the waveform 57 deleted. In particular, a pulse is produced in wave 59 corresponding to a pulse in the train 57 only when the coincidentally-occurring pulse produced by the generator 63, or that produced by the oscillator 62, is of a preselected polarity.

As further discussed below, each output pulse of the AND gate 58 will switch the interconnection of all gates 20, i.e., reverse the intelligence modulations for each of the transmission channels A–B, C–D, . . . . The selector switch 60 may include other options for producing random or quasi-random signals for generating the program switching pulses of waveform 59. One such structure, for example, comprises an oscillator varied in frequency by the output of a second oscillator.

The switching pulse output of the AND gate 58 gives rise to two distinct circuit functions. First, each pulse is supplied to the toggle input of a bistable multivibrator 70 which thus reverses its output states responsive to each such incident pulse. The 1 and 0 outputs of the bistable multivibrator 70 respectively control radio frequency gates 74 and 72, e.g., of a type discussed below in conjunction with FIG. 2, such that one and only one of the gates 74 and 72 always conducts depending upon which multivibrator output exhibits a gate enabling output potential.

A first sinusoidal pilot oscillator 71 is supplied as an input to the gate 72, and the output of a second pilot oscillator 73, differing in frequency from that of the oscillator 71, is supplied to the gate 74. The output of the gates 72 and 74 are connected together and supplied to the distribution cable 39 by way of the signal combiner 35 and the amplifier 38. Thus, the pilot signal on the cable will be of a frequency given by that of the pilot oscillator 73 when the 1 output of the multivibrator 70 is low (for the specific assumed gate construction of FIG. 2), and will correspond to the frequency of the pilot oscillator 71 when the 0 output of the multivibrator 70 is low. As will be more clear from the following discussion, the pilot frequency obtaining on the cable network 39 at any time completely defines the switching state for the gates 20, and may thus be used for signal recovery purposes by the signal recovery converter of FIG. 3.

As a second circuit function to control the gates 20, the output pulse train 59 from the AND gate 58 is delayed in a delay 66, e.g., by a monostable multivibrator. The delay 66 is included such that the pilot frequency will switch shortly before the gates 20 are switched to reverse the program content of the signal propagating channels connected thereto. This delay is introduced to compensate for the delay which will be produced in the FIG. 3 converter when the pilot signal is recovered by a demodulation process, such that the demodulated pilot signal will have a transition at substantially the time when the channel modulations alternate.

To this end, 1 and 0 outputs of the bistable multivibrator 70 are supplied to AND gates 79 and 77, respectively, together with the delayed pulse train 59. The output of the AND gates 79 and 77 are connected to a set-reset flip-flop 75 which thereby switches state. The outputs of the flip-flop 75 are thus maintained in synchronization with the outputs of the bistable multivibrator 70, except for the delay produced by the delay circuit 66. Thus, the flip-flop 75 is slaved to the multivibrator 70 with the incidence of suitable delay, such that synchronization between pilot modulation (controlled by element 70) and channel program modulation (controlled by the output signals of flip-flop 75) cannot lose synchronization should a pulse supplied by the AND gate 58 be lost in one of the two distribution paths therefor.

The 1 and 0 outputs from the flip-flop 75 are supplied as control signals to each of the gates 20 to control the signal interconnection pattern between the input and output video radio frequency signals associated therewith. Thus, for example, when the flip-flop 75 exhibits relatively high and relatively low output potential states at the 1 and 0 terminals thereof, respectively, the gate $\mathbf{20_1}$ may connect the signal sources $\mathbf{10_1}$ and $\mathbf{10_2}$ to the communications channels A and B, respectively. When the flip-flop 75 changes state, the source $\mathbf{10_2}$ would then be switched to the A channel, while video program source $\mathbf{10_1}$ is connected by the gate $\mathbf{20_1}$ to the B communication channel.

Thus, the FIG. 1 arrangement has been shown by the above to generate a composite output signal on the distribution cable network 39 formed of unencoded commercial programming; switched encripted private video channels; and a pilot carrier which varies in frequency to provide signal recovery information. It is observed at this point that any other form of pilot modulation would suffice to convey the switching synchronizing information. Thus, for example, 100 percent amplitude modulation may be effected for the purpose by simply deleting one of the gate-oscillator combinations 73–74 or 71–72 to provide no output for one state of the multivibrator 70.

A radio frequency gate suitable for employment for the gates 72 or 74 is shown in FIG. 2 and comprises a pair of oppositely poled diodes 86 and 92 having their common anode junction selectively connected to ground by transistor 88 controlled by the gate control signal (e.g., an output of multivibrator 70 for the gates 72 and 74). The radio frequency input signal is coupled by a capacitor 80 to the diode 86.

When the transistor 88 is non-conductive (low control input), the gate is open. In this state, the input signal is coupled through a gate output port via an output coupling capacitor 98 with little attenuation, each of the diodes being biased to a conducting state via current following the dashed paths 93 and 95 in FIG. 2. Accordingly, the radio frequency input signal effects perturbations for the conducting states of the diodes 86 and 92 which are coupled by the low attenuating impedance of the conducting diodes through to the capacitor 98 and to the gate output. The effective forward conduction impedance for the input alternating current radio frequency signal is very low, e.g., on the order of several ohms, thus giving rise to very little signal insertion loss or line impedance mismatching.

Conversely, when a relatively high control input signal is supplied to the transistor 88 such that the device conducts and saturates, the junction between the RF conducting diodes 86 and 92 is maintained at near ground potential. Accordingly, the diodes 86 and 92 are reverse biased to a non-conductive state by the positive potentials supplied to the cathodes thereof by resistors 82 and 94, respectively. With the diodes 86 and 92 reverse biased and therefore nonconducting, the conduction path between the capacitors 80 and 98 is effectively blocked so that signal transmission between the gate input and output ports is inhibited to a high degree of isolation. Thus, the gate structure of FIG. 2 operates in a transmission mode responsive to a low input control signal, and blocks signal propagation when the control signal becomes large enough to turn the transistor 88 on.

The FIG. 2 gate embodiment (among other well-known to those skilled in the art) may be employed for the gates 72 and 74, with the output terminals of the capacitors 98 therein being connected together. Similarly, each of the gates 20 may comprise a bridge configuration comprising four gate structures of the FIG. 2 construction located in each bridge branch. The associated two input signal sources 10 are connected to a first opposite pair of bridge nodes, and the gate output terminals 21 and 22 comprise the alternately disposed bridge node pair. The gate control signals are applied in common to diagonally opposite bridge branch gate structures.

Turning now to FIG. 3, there is shown electronic receiver-converter apparatus for reconstituting and recovering all video programs present on the cable, both of a commercial and private encripted nature. The FIG. 3 converter receives as its input signal the composite signal array then present on the cable distribution system 39, and supplies as its output television signals of suitable form for reception by conventional television receivers.

The receiver includes first ganged switches 100 and 103 adapted to selectively bypass the remaining receiver-converter structure by a conductor 108 when a subscriber wishes to view commercial television programming. More specifically, when the switch 100 engages a switch contact 102 and the switch 103 engages switch contact 105, the conduction path 108 provides a direct connection between the converter input and output to couple the cable signal contents directly to the television receiver. Thus, viewing proceeds in a conventional manner by tuning the receiver to any available commercial channel.

However, when a private program is desired, the switch 100 and 103 engage contacts 101 and 104, respectively, such that the composite converter is operatively employed. When in use, the converter receives all constituent cable signals at its input, and supplies at its output a selected private video program within a television frequency channel which is unused by any local commercial station, e.g., channel 3 or 4, as appropriate to any area. It is assumed henceforth that channel 3 is vacant, and that this channel is selected to deliver private programming to the receivers in a particular area. In the specific embodiment of our invention presented herein, all private programs are supplied by the converter output at the same channel (e.g., channel 3), independent of the identity of the communications channels actually conveying the selected program, although this is not necessary. The selection between private program channels is made in the converter by varying the positions of ganged switches 123–124 and 135.

The incoming cable signals are amplified, and the cable buffered from signals internally generated in the converter by an amplifier 103. The amplified signals are then supplied by a directional coupler 105 to mixers 107 and 115.

The mixer 115 is associated with a pilot switch-synchronizing information recovery circuit path. The mixer 115 is therefore also supplied with an appropriate oscillation of fixed frequency vis-a-vis the nominal pilot carrier frequency by an oscillator 146 and a frequency multiplier 147 to translate the modulated pilot spectrum to a fixed, relatively low and narrow frequency band. Thus, for example, assuming that the pilot oscillations supplied by the oscillators 71 and 73 at the FIG. 1 signal generator vary, for example, between 135.5 MHz and 136.5 MHz, the output of the frequency multiplier 147 may supply an output oscillation of 134 MHz to shift the modulated pilot to a frequency range of 1.5–2.5 MHz by heterodyning action. The first order difference signal from the mixer 115 is selected and amplified by a band pass filter and amplifier 117 and supplied to a frequency modulation detector 119, e.g., a discriminator, which thus recovers the switching information to characterize switching at the FIG. 1 signal generator. The output wave 118 at the output of the discriminator thus essentially corresponds to the output of the bistable multivibrator 70 at the FIG. 1 generator.

The receiver-converter of FIG. 3 includes a plurality of local oscillators $140_{A1}$ . . . $140_{01}$ . . . in one-to-one correspondence with the number of private programming communication channels A, . . . D, . . . Each oscillator $140_I$ supplies an output frequency of a value to select a corresponding communicating channel I for reception by heterodyning action performed by the mixer 107 and a following band pass filter 109 when operatively connected to the mixer 107 by an enabled associated gate $130_I$. That is, assuming the filter 109 to be tuned to the assumed channel 3 output band having a center frequency $f_3$, and assuming the center frequency of the channel I to be $f_I$, the output frequency of local oscillator $140_I$, $f_{140}$, is given $f_{140} = nf_I + mf_3$, when $n$ and $m$ in any given integer, typically one.

To illustrate the signal recovery process effected by the FIG. 3 converter-receiver, assuming that the receiver is to receive the video program supplied by one of the program sources 10, e.g., source $10_1$, transmitted over the channels A and B in alternating intervals. Accordingly, the receiver under control of the recovered switching information at the output of discriminator 119, the output of local oscillator 140A is supplied to the mixer 107 when the desired program is present on the A communication channel (gate $130_A$ enabled at such period), which oscillator $140_B$ is connected to the mixer by enabled gate $130_B$ when the desired program is communicated over the B channel. Thus, a conventional television receiver connected to the converter output and tuned to channel 3 is constantly furnished with the program originated by the source $10_1$ via an amplifier 111 and a directional coupler 113, employed for purposes discussed below.

Any other encripted program may be selected for viewing by operation of the switches 135 and 123—124. In particular, the switch 135 selects one particular pair of video programs by supplying power to only two associated oscillators 140. Thus, video sources $10_1$, $10_2$, $10_3$ and $10_4$ . . . are selected when switch 135 engages the contacts 136, 137, . . . , respectively. For any setting of the switch 135, a particular, unique selection of the two possible programs is effected by the position of the switches 123 and 124 which supply the switching digital signal recovered by the discriminator 119, or its inverse generated by an inverter 125, to the gate 130 central terminals. The operative two gates 130 thus open 180° out of phase in a sequence controlled by the switches 123–124 to continuously select the desired video program.

It is observed that the switches 123, 124 and 135, as well as the switches 100 and 103, may comprise independent poles of a ganged rotary switch such that a subscriber need only operate a single selector switch marked by channel identity designations. More specifically, it will be appreciated that portions of the desired video program are transmitted and distributed by the cable network 39 on two distinct frequency bands. As a general proposition then, these channels will arrive at the subscriber location with differing intensities by reason of the non-exact signal propagating characteristics for the two frequency channels. Absent the automatic gain control apparatus, the video display and sound intensity would vary as the modulating intelligence was alternately recovered from the two incoming transmission channels, thereby providing objectionable visual flicker. The FIG. 3 converter, therefore, includes automatic gain control structure, discussed in detail below, to present visual programs of constant intensity at the standard television receiver.

To effect the automatic gain control function, the directional coupler 113 supplies a measure of the output signal strength at the output of the FIG. 3 converter to a mixer 148 which also receives the fixed output from the oscillator 146 (through any frequency modifying circuitry, if required). The relatively narrow pass band of the filter-amplifier 150 is adapted to select a heterodyne output product from the mixer 148 corresponding to the picture carrier and its adjacent (in frequency) modulation products. A video detector 152 recovered the video modulation at the output of the amplifier 150. A peak detector 154, e.g., including the dioding (and current gain) action of the base-emitter junction of a transistor 155 and resistance-capacitance elements 157 and 166 or 168 provide an output signal indicative of the strength of the signal then being supplied to the subscriber receiver, as essentially measured by the signal voltage of the vertical synchronization pulse (the largest signal of a television wave, and thus the signal which is sensed by the amplitude peak detector 154).

The switching rectangular wave output of the discriminator 119, and its inverted replica at the output of an inverter 160, are supplied to the base terminals of two transistors 162 and 164. Accordingly, that transistor receiving a relatively positive base potential conducts while the other transistor is non-conductive. When the transistor 162 is conductive, the automatic gain control capacitor 166 is operatively connected between the peak detector 154 output port and ground via the saturated transistor 162. At this time, the capacitor 168 has one terminal thereof effectively open circuited by reason of the non-conductive transistor 164. In this latter state, the capacitor 168 performs a memory function, i.e., stores the last AGC voltage obtaining when the transistor 164 was turned off.

Correspondingly, with the transistor 164 conducting and the device 162 nonconductive, the alternate automatic gain control capacitor 168 is connected to the peak detector output while the unit 166 is disabled.

During one polarity of the switching signal output of the discriminator 119 when a signal desired for reception is being transmitted over a first communication channel, one of the capacitors, e.g., the element 166 is operatively connected in the gain control feed back loop. When the discriminator output changes state, indicating that the desired video signal is being transmitted over an alternate communications channel, the capacitor 166 is disabled and the element 168 is operatively connected. The voltage across the active capacitor 166 or 168 controls the gain of the variable gain amplifier 111 by closed loop feedback action to maintain the output signal of the amplifier 111 constant, thereby also presenting a constant level signal to the following conventional television receiver. The variable gain amplifier 111 may comprise any well-known configuration therefor, e.g., a multiplier structure, or a differential amplifier construction (wherein one of the video signals or the gain control voltages is employed to define the total current flow through the difference transistors, while the alternate signal distributes the signal current between the transistors.

To illustrate a typical sequence of control circuitry, assume that the video program conveyed by the source $10_1$ is selected for viewing, and that the signal distribution properties of the corresponding communication channels A and B differ such that the A channel furnishes to the FIG. 3 converter a signal larger in amplitude than that translated by the B channel. Accordingly, when the discriminator output switches such that the A channel is being received (gate $130_A$ and local oscillator $140_A$ being operatively employed), the appropriate capacitor, e.g., the capacitor 166, is switched into an operative state while the capacitor 168 is disabled. The capacitor 166 initially supplies a stored AGC voltage equal to the last such control voltage required to properly regulate gain of the amplifier 111 when the desired program was last being received on the A channel. The gain of the amplifier 111 will thus automatically be lowered from that previously obtaining at the very beginning of the A channel reception to a proper value under control of the stored, last sensed AGC voltage, to implement at least a good value for amplifier gain. Since last monitoring of A channel transmission occurred only seconds or fractions of seconds before the presently considered A channel reception interval, and since signal transmission tends to vary relatively slowly with equipment aging or varying environmental conditions, the AGC voltage stored in the capacitor 166 will typically be quite accurate. For the remainder of the reception period of programming from the source $10_1$ on the A channel, the AGC feed back loop will vary the voltage across the capacitor 166 as required, and to the extent required, to maintain the output signal at the prescribed level.

A short time later, when the video program of the source $10_1$ is received on the B channel, the switched outputs of the discriminator 119 and the inverter 160 connect the capacitor 168 into service to control the gain of amplifier 111 while disconnecting the capacitor 166. As before, the capacitor 168 has stored therein the best available initial AGC voltage to characterize B channel transmission, such that the amplifier gain is immediately increased at the beginning of B channel reception such that the output signal will be of the requisite, constant value.

This mode of operation continues as the desired program is alternately received on the two incoming channels which may vary in their transmission properties. The capacitors 166 and 168, and the concomitant switching elements and structure associated therewith thus function as dual sample and hold elements, operated 180° out of phase, wherein each unit retains its last value when switched out of service, and operates in a tracking mode once reconnected into service. The composite AGC circuit thus maintains the final visual and audio program essentially constant.

The above considered system arrangement has thus been shown by the above to furnish secure and reliable carrier communications in providing a first category of transmission intelligence which may be recovered by any and all system subscribers, and in supplying other, encripted communications which may be received by an appropriate subset of the system subscribers.

The above described arrangement is merely illustrative of the principles of the present invention. Numerous modifications and adaptions thereof will be readily apparent to those skilled in the art without departing from the spirit and scope thereof. For example, the arrangement is applicable to any communication system contract, wherein a plurality of independent programs, messages, data, control signals or the like are conveyed over a plurality of transmission channels, wherein at least some of the conveyed information is to be encripted. Also, while the switching apparatus in FIGS. 1 and 3 was shown as comprising apparatus wherein two programs were switched between two communications channels, as a general matter, the switching may be done in large arrays. As a general case, *n* signals may be distributed in a changing pattern among *n* communications channels in a cyclic, random, or pseudo random manner, sufficient synchronizing information being placed onto the pilot signal for signal recovery purposes.

What is claimed is:

1. In combination in a converter for receiving and operating upon an incident composite signal formed of at least one information signal, successive passages of which are distributed among and conveyed by plural transmission channels, and a pilot signal having modulated thereon switching information for identifying the transmission channel conveying said information signal, said converter including an output port, means for selecting and demodulating said pilot signal and for generating a switching control signal corresponding to said switching information, means for selectively receiving said plural transmission channels, means responsive to said switching control signal for operatively selecting the changing, particular transmission channel of the channel array signal then conveying said information signal for receiving by said receiving means and connections thereby to said output port, wherein said converter further comprises variable gain amplifier means connected to said selecting means, means for monitoring the amplitude of the output of said variable gain means, means for varying the gain of said variable gain means in accordance with the output of said monitoring means, wherein said amplitude monitoring means includes sample and hold means including plural storage elements, and means for operatively selecting a changing one of said storage elements for operative service responsive to said switching control signal.

2. In combination in a signal converter for operating on an ensemble of television signals comprising at least one unencripted video signal, at least one encripted video signal having consecutive segments thereof present on differing transmission channels, and a pilot carrier having modulated thereon switching information sufficient to identify the transmission channel conveying each encripted signal, said converter comprising pilot demodulator means for generating switching control signals in accordance with said pilot modulation, a mixer, plural controlled gates, plural local oscillators, means for enabling a selected changing one of said controlled gates responsive to said switching control signals for connecting a changing one of said local oscillators to said mixer, means for connecting the signal ensemble to said mixer, further comprising automatic gain control means including a variable gain amplifier connected to said mixer, means for sampling a measure of the output of said amplifier, and means for varying the gain of said variable gain amplifier responsive to said signal sampling means, said gain varying means including plural gain control signal storage elements, and means responsive to said switching control signal for operatively selecting a changing one of said plural storage elements.

* * * * *